Figure 1:
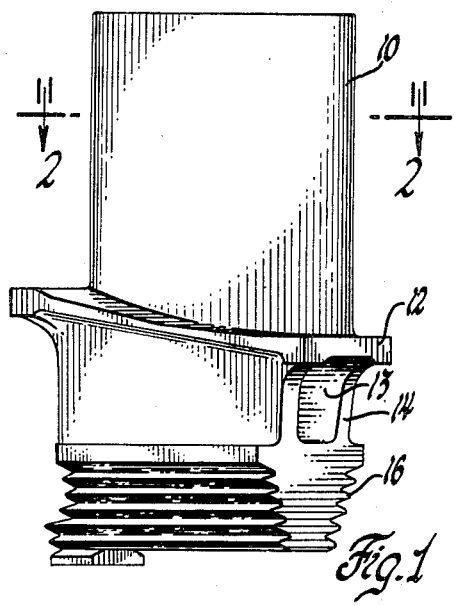

July 6, 1965

H. L. McCORMICK 3,192,578

CORE MAKING APPARATUS

Original Filed June 8, 1960

4 Sheets-Sheet 1

INVENTOR.
Hamilton L. McCormick
BY
Peter P. Kozak
ATTORNEY

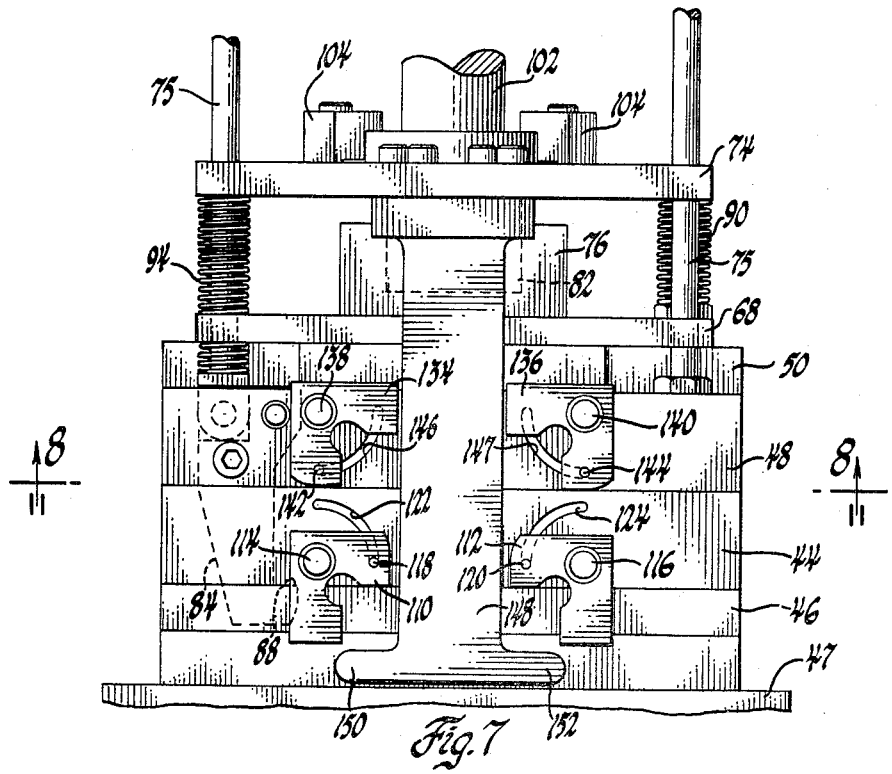
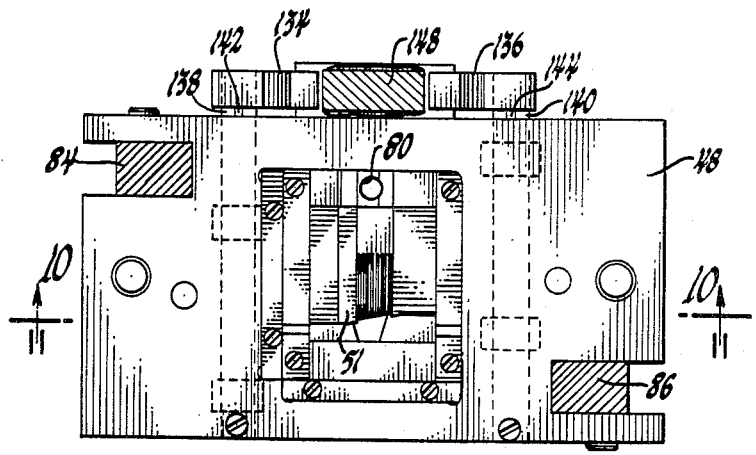

July 6, 1965

H. L. McCORMICK 3,192,578

CORE MAKING APPARATUS

Original Filed June 8, 1960

4 Sheets-Sheet 4

INVENTOR.
Hamilton L. McCormick
BY
Peter P. Kozak
ATTORNEY

United States Patent Office 3,192,578
Patented July 6, 1965

3,192,578
CORE MAKING APPARATUS
Hamilton L. McCormick, Carmel, Ind., assignor to General Motors Corporation, Detroit, Mich., a corporation of Delaware
Original application June 8, 1960, Ser. No. 34,792. Divided and this application Aug. 17, 1961, Ser. No. 132,150
5 Claims. (Cl. 22—10)

This application is a division of the co-pending patent application Serial No. 34,792, filed June 8, 1960, now abandoned, and assigned to the assignee of the present invention.

This invention relates to hollow turbine blades and vanes, entrance guide vanes and the like which have fluid passages therethrough to provide means for cooling the blade during the operation of the engine in connection with which it is used, and a method and apparatus for making the same.

In turbojet engines or the like a turbine operated by burning gases drives a blower which furnishes air to a burner. Such turbines operate at high temperatures and the capacity of the engine is in part limited by the ability of the metal of which the turbine blades are made to withstand the high operating temperatures. One approach to increasing the operating temperature of these engines involves providing the blades with cooling means in the form of openings through the airfoil of the blade through which a coolant fluid such as air may be passed during operation of the engine. Casting blades of this type involves difficult foundry problems because the airfoil of the blades is relatively thin and may involve a markedly curved configuration. Moreover, the coolant passages must be accurately positioned within the blade so as to enable the coolant gas to perform its desired function and yet be designed so as not to weaken the blade.

It is the basic object of this invention to provide a unitarily cast turbine blade, vane and the like having coolant passages extending through the airfoil thereof by means of which the airfoil may be efficiently cooled and having a structure which is sufficiently sturdy to withstand the forces imposed on the blade during operation of the engine in connection with which it is used. To this end, a hollow blade, vane or the like is cast which has a plurality of internal ribs extending longitudinally of the blade and projecting inwardly of each airfoil wall toward the interior of the blade and a plurality of integrally cast supports or pedestals extending between the airfoil walls. The internal ribs serve to efficiently transfer heat from the airfoil surfaces into the air coolant passage whereby the blade is efficiently cooled and the integral support members serve to both rigidify the blade structure and also to transfer heat from the airfoil surfaces into the coolant passage.

It is a further object of this invention to provide a method of casting a hollow blade or the like having opposed airfoil walls, a plurality of spaced ribs extending from each of the airfoil walls inwardly thereof and a plurality of spaced pedestals or supports extending transversely of the blade and connecting the opposed airfoil walls.

Another object of this invention is to provide a core for use in the aforementioned method and to provide mold apparatus for making the core.

These and other objects are accomplished by providing a destructible ceramic core which has the general configuration of the vane or turbine blade to be cast including an airfoil portion having opposed concave and convex airfoil surfaces. A plurality of spaced parallel grooves are provided in each airfoil wall longitudinally thereof and a plurality of spaced transverse openings are provided through the airfoil portion of the core. The core is manufactured by an injection die apparatus which includes a mold cavity having the configuration of the core to be formed. The apparatus includes a plurality of spaced retractable fins which are adapted to project into the die cavity a predetermined distance from opposed walls of the die cavity. The apparatus also preferably includes spaced extensions on certain of the opposed fins which engage opposed fins when the fins are inserted within the die cavity. In manufacturing the core, a suitable ceramic mix is injected into the mold cavity while the aforesaid fins project into the die cavity and the aforesaid extensions engage at least one fin member on the opposite side of the die cavity. After the die cavity has been filled with the ceramic mix, the longitudinal fins together with the fin extensions are retracted from the die cavity. The thusly formed core is then dried and fired. A heat destructible pattern is then formed about the ceramic core which corresponds in its outer configuration to the outer configuration of the blade to be cast and this pattern is then invested in a refractory mold. After the refractory mold has been set, it is fired whereby the heat destructible portion of the pattern is melted out and the core is left supported within the resulting mold cavity by suitable core prints. Molten metal is then cast into the resulting mold cavity about the above-described core. The core is then leached out or otherwise removed from the casting to form a hollow blade having a plurality of spaced longitudinal ribs extending inwardly from each of the airfoil walls and a plurality of transverse pedestals or supports integrally attached to the opposed airfoil walls. The pedestal or support portions of the blade extending transversely therethrough provide the blade with a high degree of structural strength while the longitudinal fins extending inwardly of the airfoil walls provide a highly efficient means for transmitting the heat from the working surfaces of the airfoil walls into the interior hollow portion thereof through which a coolant fluid is passed in the operation of the engine in connection with which the blade is used.

Figure 2:
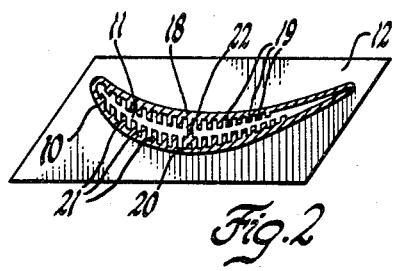
Figure 4:
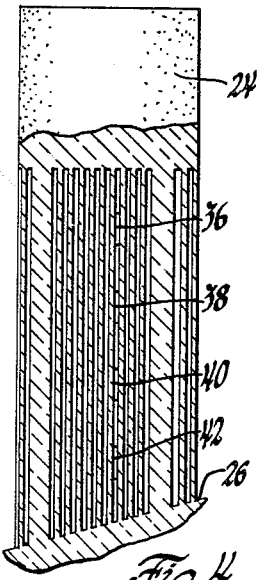
Figure 3:
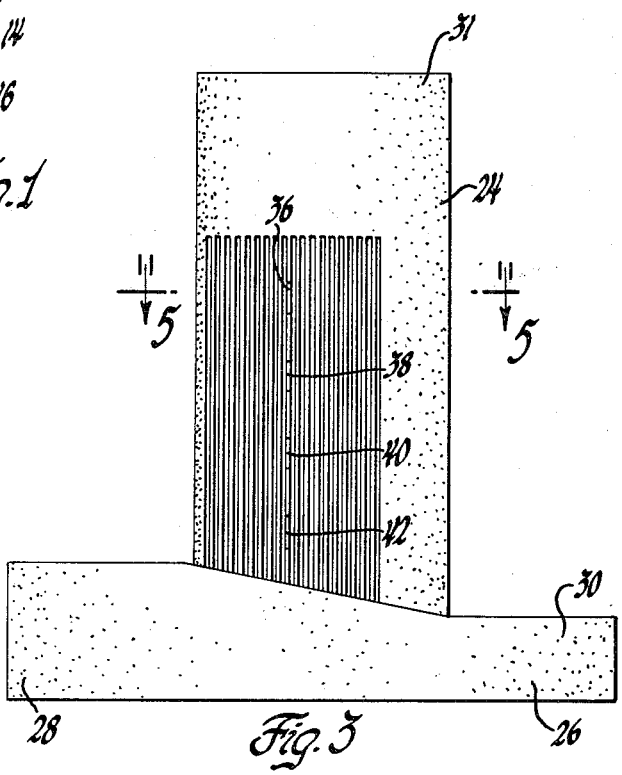
Figure 5:
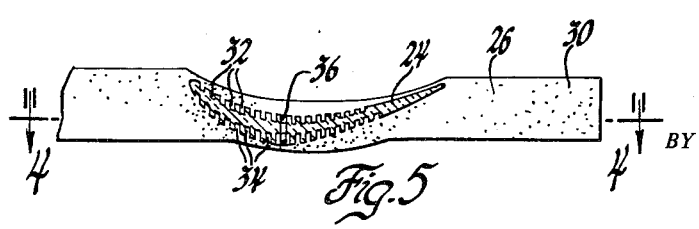
Figure 6:
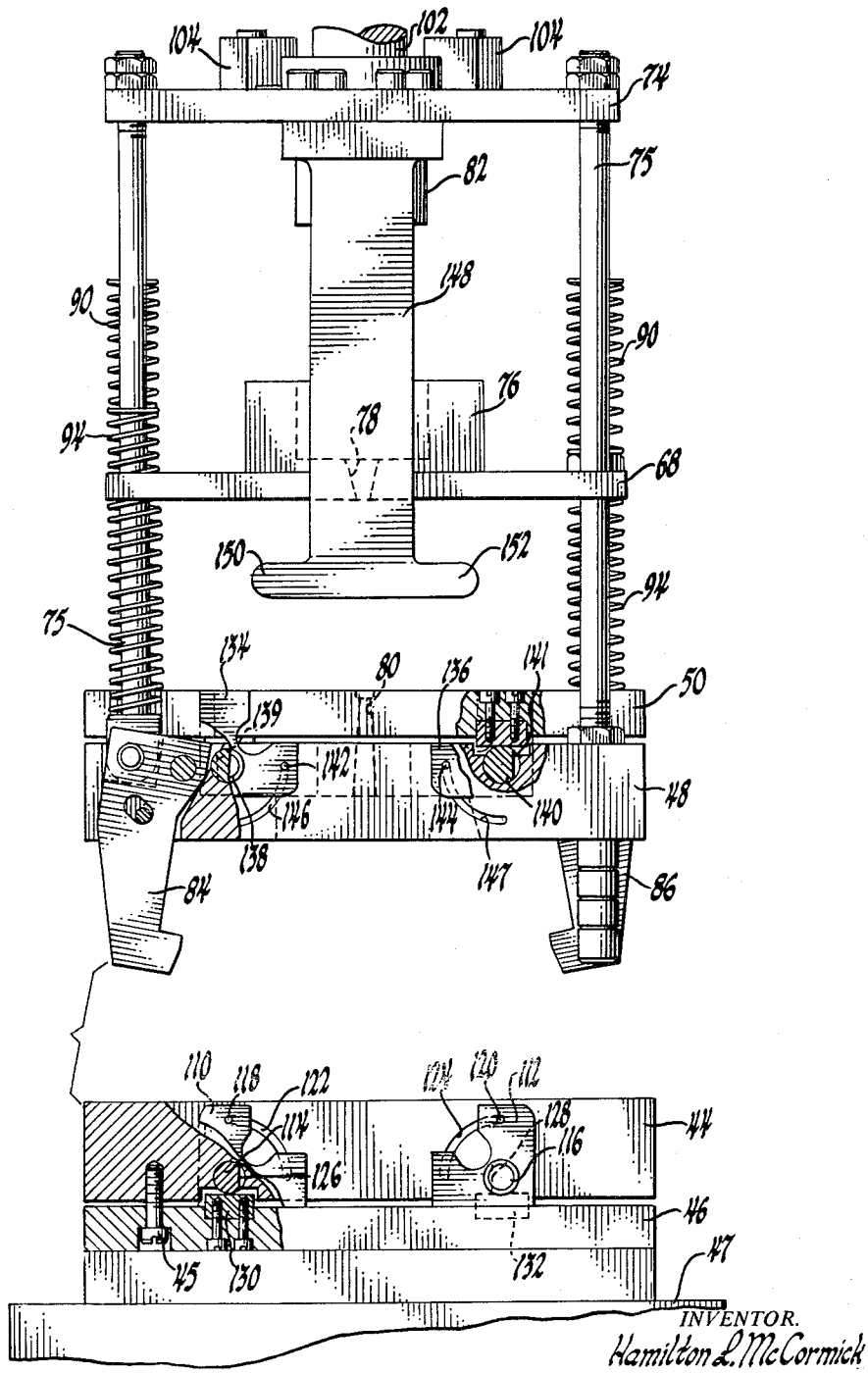
Figure 9:
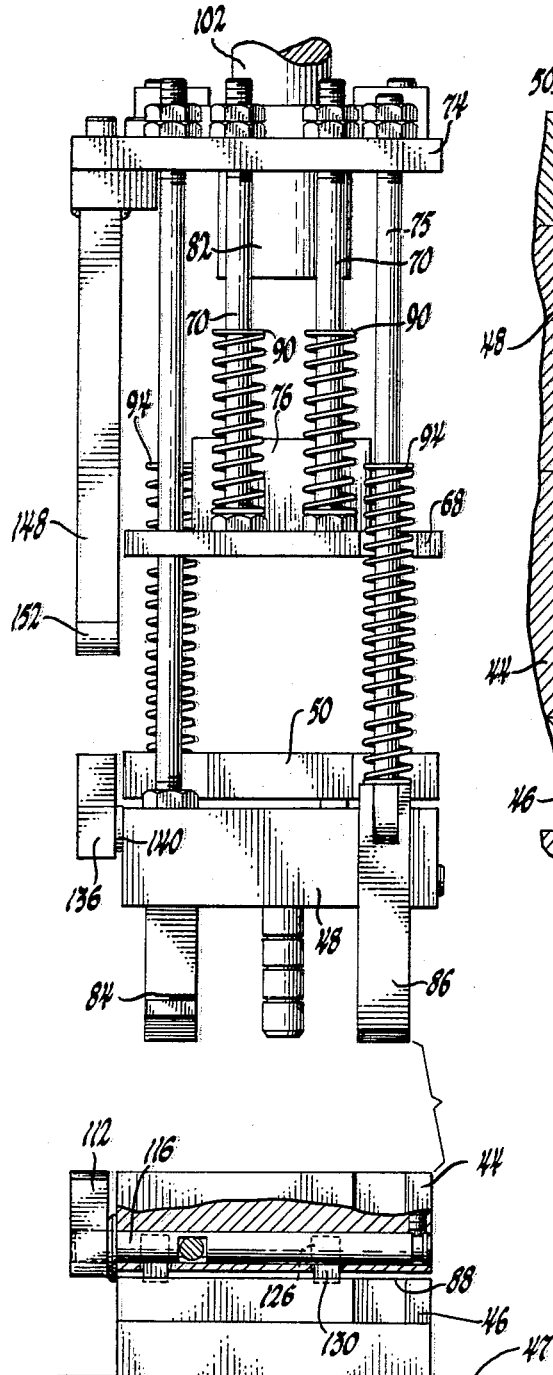
Figure 10:
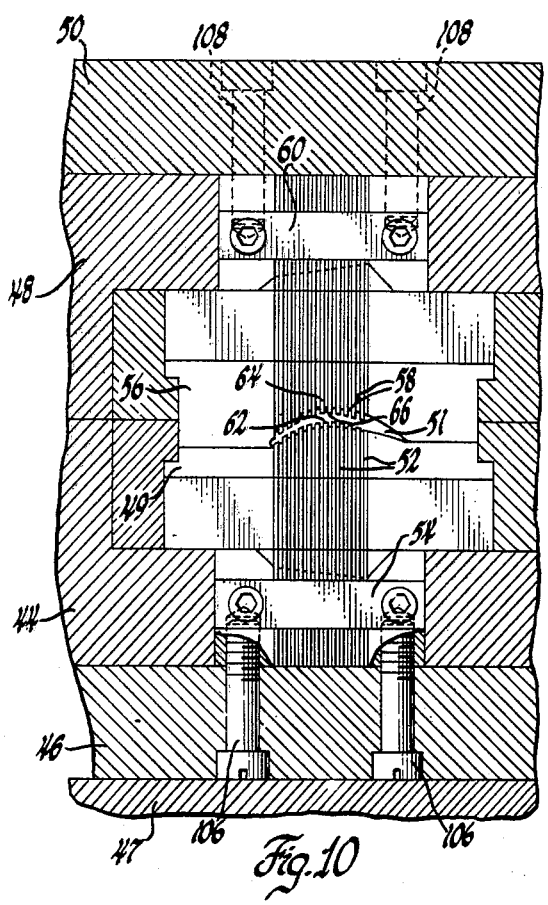

Other objects and advantages of this invention will more fully appear from the following detailed description, reference being made to the accompanying drawings, in which:

FIGURE 1 is an elevation view of a turbine blade;
FIGURE 2 is a cross-sectional view taken along line 2—2 of FIGURE 1;
FIGURE 3 is an elevation view of a core used in the casting of the turbine blade shown in FIGURE 1;
FIGURE 4 is a cross-sectional view taken substantially along line 4—4 of FIGURE 5;
FIGURE 5 is a cross-sectional view taken along line 5—5 of FIGURE 3;
FIGURE 6 is an elevation view of a die apparatus for molding the core of FIGURE 3 which is shown in die open position;
FIGURE 7 is an elevation view of the die apparatus shown in a die closed position;
FIGURE 8 is a view taken along line 8—8 of FIGURE 7, the parting line of the die;
FIGURE 9 is an elevation side view of the die apparatus of FIGURE 6 shown in a die open position; and
FIGURE 10 is a cross-sectional view taken along line 10—10 of FIGURE 8.

Referring more particularly to the drawings, FIGURES 1 and 2 show a unitarily cast turbine blade of the present invention. The blade includes an airfoil portion 10 having a longitudinal passage 11 therethrough, a platform portion 12, a stalk or shaft portion 14, and a root portion 16. As shown in FIGURE 2, the airfoil portion 10 of the blade is hollow and has a concave wall portion 18 and a convex wall portion 20 which surround the passage 11. The concave wall portion 18 has a plurality of longitudinal ribs or fins 19 projecting from the inner wall thereof into the interior of the blade. Similarly, the concave wall portion 20 has a plurality of spaced longitudinal ribs or fins 21 projecting from the inner surface thereof toward the interior of the blade. The airfoil portion 10 also includes a plurality of integrally cast pedestals or supports 22 extending from the concave airfoil wall portion 18 to the convex airfoil wall portion 20. Preferably these pedestals are disposed substantially along the longitudinal axis of the blade in spaced relation to provide the hollow airfoil with adequate strength along its entire length.

In the preferred embodiment of the invention a coolant fluid opening 13 is provided which extends through the shaft portion 14 and communicates with the hollow passage 11 of the airfoil. It will be apparent that other arrangements for the fluid entry may be provided within the spirit of the invention as, for example, a longitudinal opening through the root 16 of the blade which is in effect a longitudinal continuation of the hollow portion 11 of the blade.

It will be noted from an examination of FIGURE 2 that the ribs 19 and 21 are of a greater height at the central or thicker portions of the airfoil and are of a progressively lesser height toward the edges of the airfoil so that the hollow passage 11 between the ribs 19 and 21 is of substantially the same thickness across the width of the blade whereby a uniform cooling effect is achieved.

The turbine blade shown in FIGURES 1 and 2 is cast by means of the so-called "lost wax" process. Broadly speaking, this process involves forming the core shown in FIGURES 3, 4 and 5 which has the configuration of the hollow passage 11 of the airfoil and the coolant fluid entry passage 13 through the stalk. A wax pattern is formed over this core which has the outer configuration of the turbine blade shown in FIGURE 1 and the pattern is invested. The refractory material of the investment is then fired and the wax caused to flow or burn out to form a mold which includes a cavity having the configuration of the blade shown in FIGURE 1 having the core shown in FIGURE 3 positioned therein. Molten metal is then cast in the cavity. Finally, the core shown in FIGURE 3 which is preferably formed of a caustic leachable, ceramic material is dissolved out to provide the completed turbine blade shown in FIGURE 1.

As is shown in FIGURE 3, the core consists of an airfoil passage portion 24 and a fluid entry passage portion 26. The fluid passage portion 26 has elongated ends 28 and 30 which serve as core prints. Similarly, the end 31 of the airfoil passage portion is somewhat elongated so that it also may serve as a core print. As shown in FIGURE 5, the airfoil passage portion 24 of the core is provided with a series of spaced grooves 32 on the concave side and a series of spaced grooves 34 on the convex side thereof. The grooves 32 and 34 will form the ribs 19 and 21 respectively of the turbine blade in the subsequent casting procedure. At equally spaced points 36, 38, 40 and 42, sections of the core between adjacent grooves are removed so that openings are formed in the core at the points 36, 38, 40 and 42. The purpose of these openings is to form the pedestals 22 extending from the concave to the convex airfoil walls. Preferably the grooves 32 and 34 extend to a point somewhat short of the top of the core so that in the resulting blade the end section of the blade is not ribbed.

The core shown in FIGURES 3, 4 and 5 is made as follows. A ceramic mix is provided which may be injection molded and which, on being fired, will not warp or shrink unduly and will be capable of withstanding thermal shock due to the molten metal being poured thereagainst in the casting process. Further the fired ceramic material must be capable of being leached out or otherwise removed after the metal casting process.

A suitable composition for this purpose is a mixture containing oxides of aluminum and silicon, a plasticizer and a binder such as polystyrene. Suitable commercial ceramic materials of this type are produced by the American Lava Company and are known as Alsimag 145 and Alsimag 670. A specific example of a suitable ceramic mix consists by weight of 84 parts of alumina, 5 parts shellac, 5 parts Ethocel, 0.2 parts stearic acid, 2 parts heater oil, 2 parts butyl phthalate, 0.5 parts oleic acid and 2 parts n-butyl stearate. A suitable injection molding apparatus for use in molding the core member shown in FIGURE 3 is shown in FIGURES 6 through 10 and forms a portion of this invention. Referring to FIGURE 6, the injection molding apparatus includes a lower die block member 44 mounted by means of bolt 45 on a plate 46 for limited relative vertical movement. The plate 46 is rigidly attached to a base 47. A vertically movable upper die block member 48 is associated with a plate 50 for a limited relative vertical movement.

As shown in FIGURE 10, the lower die block 44 includes a die 49 which defines the lower portion of the die cavity 51. The lower die 49 includes a series of slots in which are retractably positioned a series of plates 52. The plates 52 are supported in spaced relation by the bar 54 beneath the die block 44 and attached to the plate 46 by means of the bolts 106. The plates 52 are of a length such that when the block 44 rests on the plate 46, the upper ends of the plates 52 project into the die cavity 51 an amount equal to the depth of the grooves 32 of the core as shown in FIGURE 5.

The upper die half 56 mounted in the upper die block 48 defines the upper or convex portion of the die cavity and has provided therethrough a series of spaced slots in which are positioned a series of retractable plates 58. The plates 58 are attached to the plate 50 by means of the bar 60 and bolts 108 and are of a length such that when the blocks 44 and 48 and the plates 46 and 50 are in an abutting position, the lower ends of the plates 58 project into the die cavity an amount corresponding to the grooves 34 of the core as shown in FIGURE 5. One of the plates 62 in the lower die block 44 has elongated portions at spaced intervals which enter the space between a pair of plates 64 and 66 when the plates 58 are in a lowermost position and the plates 52 are in an uppermost position so as to provide the openings 36, 38, 40 and 42 in the core.

Referring to FIGURES 6 and 9, the injection mold apparatus includes a plate 68 attached for reciprocable movement to the rods 70 and a second plate 74 reciprocably mounted on the rods 70 and the guide rods 75. The guide rods 75 are attached to each corner of the upper die block 48 and each rod slidably extends through an opening in the plate 74. The lower plate 68 supports an injection cylinder 76. An injection opening 78 is provided in the base of the injection cylinder 76 which extends through the plate 68. The base of the opening 78 is adapted to communicate with an injection opening 80 in the upper die block and plate 48 and 50 respectively when the plate 68 is in its lowermost position in contact with the plate 50. The injection opening 80, of course, leads to the die cavity 51 as shown in FIGURE 10.

The plate 74 supports a piston 82 which is adapted to operate within the cylinder 76. It will be readily apparent that when, as shown in FIGURE 7, the die blocks 44 and 48 are in a closed position and the plate 50 abuts the die block 48, the plate 68 may be moved to a position of abutment with the plate 50 whereby the opening 78 of plate 68 is in communication with the injection opening 80 of the die block. Further in this position the plate 74 may be lowered so that the piston 82 attached thereto may subject any moldable substance within the cylinder 76 to injection molding pressure so as to force the moldable material into the die cavity 51.

Referring again to FIGURES 6 and 9, the upper die block portion 48 carries a pair of pivotally mounted hooks 84 and 86 which are adapted to engage a shoulder 88 in the lower die block 44 when the die blocks 44 and 48 are in a fully closed position as shown in FIGURE 7. The plate 68 normally rests on the plate 50 of the upper die block 48 as shown in FIGURE 7. The plate 68 is shown in a raised position in FIGURES 6 and 9 so as to better illustrate the apparatus. Compression coil spring members 90 are disposed about the guide rods 70 through which pressure is imposed on the upper plate 50 when the piston carrying plate 74 is lowered in an injection stroke into engagement with these coil springs. Similarly, coil springs 94 are disposed about the guide rods 75 extending from the die block 48 for placing the die blocks 44 and 48 and the plate 46 under compression when the plate 74 is brought down in a compression stroke. The piston carrying plate 74 is attached to a hydraulically operated rod 102 by means of lugs 104. The hydraulic rod 102 is operatively connected to a hydraulic piston (not shown) whereby the piston carrying plate 74 may be reciprocated vertically to operate the apparatus in an injection cycle as will be described in detail hereinafter.

As indicated above, the longitudinal plates 52 and 58 are attached to the plates 46 and 50 respectively whereby a vertical movement of these plates relative to the die blocks 44 and 48 respectively is effective in inserting the ends of these bar members into the die cavity 50 and withdrawing them therefrom. The bars 54 and 60 support the plates 52 and 58 respectively in a parallel aligned position.

Referring to FIGURE 6, a pair of L-shaped cranks 110 and 112 are attached to cam shafts 114 and 116 respectively journaled in the die block 44 and supporting the die block 44 on the adjustable blocks 130 and 132 mounted on the plate 46. Pins 118 and 120 attached to the cranks 110 and 112 respectively extend into grooves 122 and 124 respectively within the lower die block 44 which guide the movement of the cranks 110 and 112 respectively through an angle of 90°. This 90° movement is illustrated in the difference in the positions of these members in FIGURES 6 and 7. FIGURE 6 shows the crank portions in a vertical position whereas FIGURE 7 shows these crank portions in a horizontal position. It will be noted that when the cranks 110 and 112 are in a vertical position, the cams 114 and 116 support the die block 44 on a round portion thereof so that the die block 44 is raised a short distance from the plate 46. When the cranks 110 and 112 are moved to a horizontal position as shown in FIGURE 7, the cams 114 and 116 support the die block 44 on their flat sides 126 and 128 whereby the block 44 is in a lowered position on the plate 46. It is readily apparent that when the die block 44 is in a raised position with respect to the plate 46, the plates 52 are in a position retracted from the die cavity 51.

Similarly, the upper block 48 has the L-shaped cranks 134 and 136 connected to cam shafts 138 and 140 respectively. These cranks also include projecting pins 142 and 144 which ride in arcuate grooves 146 and 147 respectively whereby the cranks 134 and 136 may be moved through an arc of 90°. When in the upper position shown in FIGURE 6, the cam shafts 138 and 140 support the plate 50 on the round portions thereof so that the plates 58 are retracted from the mold cavity 51. When the cranks 134 and 136 are moved to a horizontal position as shown in FIGURE 7, the cam shafts 138 and 140 are moved so that they support the plate 50 on their flat sides 139 and 141 respectively.

The apparatus further includes a downwardly projecting arm 148 rigidly connected to the piston carrying plate 74 which has opposed horizontal projecting detents 150 and 152. It may readily be seen that as the arm 148 is moved downwardly, the detents 150 and 152 will move the cranks 134 and 136 respectively through an angle of 90°, and as the arm 148 continues in its downward path, it will move the cranks 110 and 112 through an angle of 90°. At this time the mechanism will be in the position shown in FIGURE 7. The cranks 134 and 136 as well as the cranks 110 and 112 are all in a horizontal position with the result that the plates 58 and the plates 52 project into the mold cavity 51 as shown in FIGURE 10. When the arm 148 is moved upwardly, the crank arms 110 and 112, 134 and 136 are moved to a vertical position with the result that the plates 52 and 58 are retracted from the mold cavity 51.

The complete operation of the core injection apparatus is as follows. The mold apparatus is assembled in an operating position when the lower and upper die blocks 46 and 48 are clamped together by means of the hooks 84 and 86 and the cylinder carrying plate 68 rests on the upper die block plate 50. In this position the cam shafts 138 and 140 support the plate 50 on their round portions and the cam shafts 114 and 116 support the die block 44 on their round portions so that the plates 52 and 58 are withdrawn from the die cavity 51. A preformed and preferably preheated biscuit of the plasticized ceramic mix is placed in the cylinder 76 and hydraulic pressure is applied to the plate 74 by means of the rod 102 to cause the plate 74 to descend. As the plate 74 descends, the arm 148 first progressively moves the then vertically disposed cranks 134, 136, 110 and 112 into a horizontal position as shown in FIGURE 7 with the result that the cams 138 and 140 support the plate 50 on their flat sides 139 and 141 respectively and the cams 114 and 116 support the die block 44 on their flat sides 126 and 128 respectively so that the plates 52 and 58 are inserted into the die cavity 50 as shown in FIGURE 10. The crank arms, it will be observed, are locked in place by means of the pins 142, 144, 118 and 120 so that the subsequent injection of the ceramic mix does not alter the position of these plates within the cavity 51. Near the end of the downward movement of the plate 74 and after the cranks 134, 136, 110 and 112 have been moved to a horizontal position, the piston 82 is brought to bear down upon the biscuit to transfer the ceramic mix into the die cavity 51 through the sprue openings 78 and 80. After the injection has been completed, the plate 74 is raised and the cranks 134, 136, 110 and 112 are again moved to a vertical position. As the crank arms are moved to a vertical position, the cam members 114 and 116 again support the die block 44 on their round portions and cam members 138 and 140 support the plate 50 on their round portions so that the plates 52 and 58 are withdrawn from the mold cavity. Thereafter the die blocks are opened and the core is dried and subsequently fired.

After the core has been formed, a pattern of destructible material is cast or otherwise formed about the core and the pattern is invested in the refractory material in a manner well known in the art. The pattern is preferably formed of a low temperature fusing substance such as wax or a thermoplastic synthetic resin or any other vaporizable, fusible, combustible or otherwise destructible material. However, a wax or plastic pattern may be employed with optimum results. Among the plastic materials which are satisfactory for use as pattern material are polystyrene and polymerized derivatives of acrylic and methacrylic acid.

The pattern is preferably formed by placing the fired core such as is shown in FIGURE 3 in an injection fixture (not shown) having a die cavity in the shape of the blade to be cast in which the core is supported by the end 31 of the airfoil portion 24 of the blade and the fluid entry end portions 28 and 30 which serve as core prints. The pattern material is injected about the core to form a pattern identical in shape to the cast blade shown in FIGURE 1 wherein the blade portion is formed of the aforesaid pattern material and envelops the core.

The surfaces of the pattern are next coated with a ceramic wash or coating material to provide a smooth casting surface on the refractory mold to be formed over this pattern. Preferably the coating material comprises an aqueous dispersion of conventional finely comminuted refractory materials, a binder such as an air-setting silicate cement and defoaming and wetting agents.

Coating of the pattern with the ceramic wash is preferably accomplished by dipping the pattern into the coating solution. In some instances the coating material may be applied by spraying or painting the coating onto the pattern. The dipping procedure is preferred because this method assures a more uniform coating of all surface portions of the pattern and is a simple method.

The dip coat slurry is preferably kept in a constant motion by stirring except during the actual dipping operation. The mixing action should not unnecessarily introduce air into the slurry and care should be exercised in the dipping operation to prevent air entrapment between the pattern and the coating. Preferably the dip coat solution is maintained at room temperature during the dipping operation since excessive heat may result in a distortion of the plastic or wax pattern. The excess coating material is permitted to drain off prior to investment of the pattern.

After the pattern has been completely cured with the dip coat slurry, it is preferably sanded or "stuccoed" to provide a rough surface on the coating which insures greater adhesion between the principal refractory portion of the mold and the dip coat on the pattern. The sanding is accomplished by merely screening or otherwise applying silica sand or other suitable refractory material to the dip coat of the destructible pattern. Thereafter the coated pattern is air dried.

Following the preparation of the pattern as above indicated, an investment mold (not shown) containing a relatively coarse refractory material is formed on the pattern. Suitable gating portions preferably made of the same material as the pattern are attached to the pattern and permitted to extend through the wall of the refractory mold to permit the escape of the destructible pattern material and to form an ingate for the molten casing metal. This refractory mold may be formed about the pattern in any suitable manner and hence the procedure of forming it will not be described in detail. A satisfactory procedure is that of mixing the refractory mixture in a predetermined quantity of a liquid binder, positioning the pattern within a suitable flask or sleeve and pouring the refractory mixture over the pattern and then allowing the refractory material to set. The refractory body may be formed of a conventional silica investment having an ethyl silicate binder or any other suitable investment material. An example of an investment dry grog or mix which may be used is one comprising major proportions of a finely ground burned fire clay and silica flour and minor proportions of magnesium oxide and borax glass. The binder for this grog may include an aqueous solution of condensed ethyl silicate, ethyl alcohol and hydrochloric acid. In the process of forming the investment mold, the ends 28, 30 and 31 of the core which project beyond the destructible pattern are embedded in the refractory material to provide a support for the core within the refractory mold.

When the refractory mold material has solidified or set to a sufficient extent, heat is applied thereto to melt the pattern. It is necessary to apply sufficient heat to raise the mold temperature above the fusion point of the pattern material, thus permitting the molten material of the pattern to escape through the gate in the mold.

Upon removal of the pattern from the mold in the foregoing manner, the molten casting metal is poured into the mold cavity formed by the removal of the pattern material. After the molten metal has been poured and the casting solidified, the refractory mold body is broken away to permit removal of the casting. The casting is then immersed in a suitable solvent solution whereby the core material contained in the cast body is dissolved or leached out. A suitable leaching agent for this purpose is a molten reducing salt such as the Kolene salt produced by the Kolene Corporation which requires no venting precautions and will not adversely react with the casting metal.

The hollow configuration of the turbine blade of this invention provides it with satisfactory strength and a highly efficient cooling effect. In the event that the cooling rate is excessive, the size of the cooling passages may be accurately and efficiently reduced by subjecting appropiate portions of the core to a suitable solvent solution. It has been found that an acid solution consisting of 100 milliliters of 52% to 55% hydrofluoric acid and 600 milliliters of 36% hydrochloric acid will remove about 0.004 inch from each side of the core in a period of three minutes at about 150° F. Portions of the core which are not to be subjected to the solvent solution may be protected by a suitable stop-off agent.

While the present invention has been described by means of certain specific examples, it will be understood that the scope of the invention is not to be limited thereby except as defined in the following claims.

I claim:

1. Core making die apparatus comprising, in combination, first and second complementary die block members defining a die cavity therebetween, a plurality of first elongated core plates retractably extending through said first die block into said cavity and a plurality of second elongated core plates retractably extending through said die block into said cavity, first movable plate means attached to each of said first core plates, a second movable plate means attached to each of said second core plates, first cam means for supporting said first plate means in a first position whereby said first core plates are retracted from said die cavity and for supporting said first plate means in a second position whereby said first core plates extend into said die cavity a predetermined amount, second cam means for supporting said second plate means in a first position whereby said second core plates are in a retracted position and for supporting said second plate means in a second position whereby said second core plates extend into said die cavity a predetermined amount, piston means for injecting a plastic material into said cavity, means operatively connected to said piston means for sequentially operating said first and second cam means to cause said core plates to project into said cavity when said piston means is actuated to inject plastic material into said cavity.

2. Core making apparatus comprising in combination, first and second complementary die block members defining a cavity therebetween, a plurality of first elongated core plates retractably extending through said first die block into said cavity and a plurality of second elongated core plates retractably extending through said second die block into said cavity, a first movable plate means attached to each of said first core plates, a second movable plate means attached to each of said second core plates, a first cam means for supporting said first plate means in a first position whereby said first core plates are retracted from said cavity and for supporting said first plate means in a second position whereby said first core plates extend into said die cavity a predetermined amount, a second cam means for supporting said second plate means in a first position whereby said second core plates are in a retracted position and for supporting said second plate means in a second position whereby said second core plates extend into said die cavity a predetermined amount, piston means for injecting a plastic material into said cavity, crank means for actuating each of said cam means to support said first and second core plates between said first and second positions, an arm means operatively connected to said piston means movable with the movement of said piston for sequentially operating said crank means to cause said core plates to project into said cavity when said piston means is actuated to inject plastic material into said cavity.

3. Core making apparatus comprising in combination, first and second complementary die block members defining a cavity therebetween, a plurality of first elongated core plates retractably extending through said first die block into said cavity and a plurality of second elongated core plates retractably extending through said second die block into said cavity, a first movable plate means attached to each of said first core plates, a second movable plate means attached to each of said second core plates, a first cam means for supporting said first plate means in a first position whereby said first core plates are retracted from said cavity and for supporting said first plate means in a second position whereby said first core plates extend into said die cavity a predetermined amount, a second cam means for supporting said second plate means in a first position whereby said second core plates are in a retracted position and for supporting said second plate means in a second position whereby said second core plates extend into said die cavity a predetermined amount, piston means for injecting a plastic material into said cavity, crank means for actuating each of said cam means to support said first and second core plates between said first and second positions, an arm means operatively connected to said piston means movable with the movement of said piston for sequentially operating said crank means to cause said core plates to project into said cavity when said piston means is actuated to inject plastic material into said cavity and for operating said crank means in reverse sequence to cause said core plates to be retracted from said cavity when said piston means is actuated in the reverse direction.

4. Core making apparatus comprising in combination first and second complementary die block members defining a die cavity therebetween, a plurality of elongated core plates retractably extending through one of said die blocks into said cavity, a movable plate means attached to each of said core plates, a cam means for supporting said plate means in a first position whereby said core plates are retracted from said die cavity and for supporting said plate means in a second position whereby said core plates extend into said die cavity a predetermined amount, piston means for injecting a plastic material into said cavity and means operatively connected to said piston means for operating said cam means to cause said core plates to project into said die cavity when said piston means is actuated to inject plastic material into said cavity.

5. Core making apparatus comprising in combination first and second complementary die blocks disposed vertically one over the other defining a die cavity therebetween, a plurality of first elongated core plates vertically and retractably extending through said first die block into said cavity and a plurality of second elongated core plates vertically and retractably extending through said second die block into said cavity, a first movable plate means attached to each of said first core plates, a second movable plate means attached to each of said second core plates, a first cam means for supporting said first plate means in a first vertical position whereby said first core plates are retracted from said die cavity and for supporting said first plate means in a second vertical position whereby said first core plates extend into said die cavity a predetermined amount, a second cam means for supporting said second plate means in a first vertical position whereby said second core plates are in a retracted position and for supporting said second plate means in a second vertical position whereby said second core plates extend into said die cavity a predetermined amount, piston means mounted over the uppermost die block for injecting a plastic material into said cavity, and a vertically disposed arm means operatively connected to said piston means for sequentially operating said first and second cam means to cause said core plates to project into said cavity when said piston means is moved vertically downwardly to inject plastic material into said cavity.

References Cited by the Examiner

UNITED STATES PATENTS

| | | | |
|---|---|---|---|
| 417,591 | 12/89 | Serve | 22—13 |
| 928,786 | 7/09 | McNamara | 22—50 |
| 1,187,027 | 6/16 | Bates | 22—13 |
| 1,347,080 | 7/20 | Clark | 22—13 |
| 1,378,524 | 5/21 | Clark | 22—13 |
| 1,968,703 | 7/34 | Peyinghaus | 22—10 |
| 2,278,190 | 3/42 | Bodi | 22—10 |
| 2,474,186 | 6/49 | Marks | 22—165 |
| 2,688,781 | 9/54 | Fahlberg et al. | 22—165 |
| 2,749,586 | 6/56 | Kohl et al. | 22—194 |
| 2,829,409 | 4/58 | Frommer | 22—93 |
| 2,835,006 | 5/58 | Fourden et al. | 22—93 |

MICHAEL V. BRINDISI, *Primary Examiner.*

WINSTON A. DOUGLAS, RAY, K. WINDHAM, MARCUS U. LYONS, *Examiners.*

UNITED STATES PATENT OFFICE
CERTIFICATE OF CORRECTION

Patent No. 3,192,578                                            July 6, 1965

Hamilton L. McCormick

It is hereby certified that error appears in the above numbered patent requiring correction and that the said Letters Patent should read as corrected below.

In the grant (only), line 1, name of inventor, for "Hamilton L. McCormic" read -- Hamilton L. McCormick --; column 7, line 28, for "slica" read -- silica --; line 38, for "casing" read -- casting --; column 8, line 29, before "die" insert -- second --.

Signed and sealed this 28th day of December 1965.

(SEAL)
Attest:

ERNEST W. SWIDER                                        EDWARD J. BRENNER
Attesting Officer                                            Commissioner of Patents